June 13, 1961 D. L. STEPAT ET AL 2,987,831
TEACHING AID FOR DEMONSTRATING CLOTHING DESIGNS
Filed March 24, 1958 3 Sheets-Sheet 3
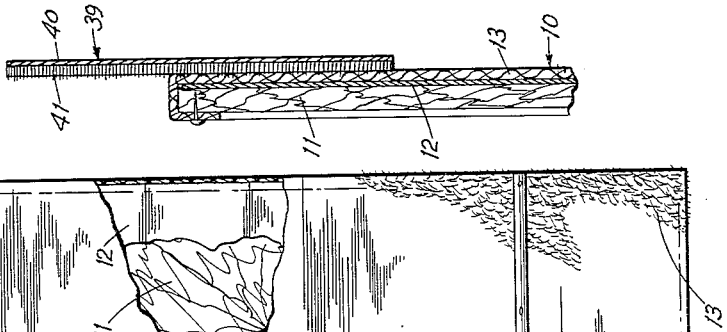
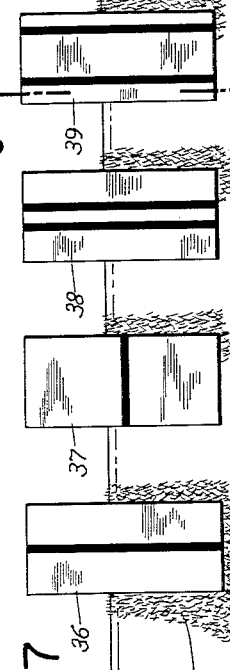
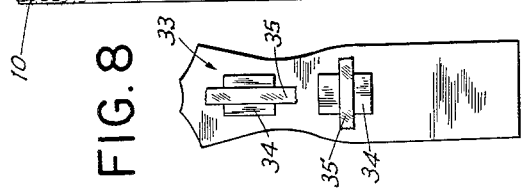
INVENTORS
Dorothy L. Stepat
Mildred Graves Ryan
BY
Joseph Hirschman
ATTORNEY United States Patent Office 2,987,831
Patented June 13, 1961

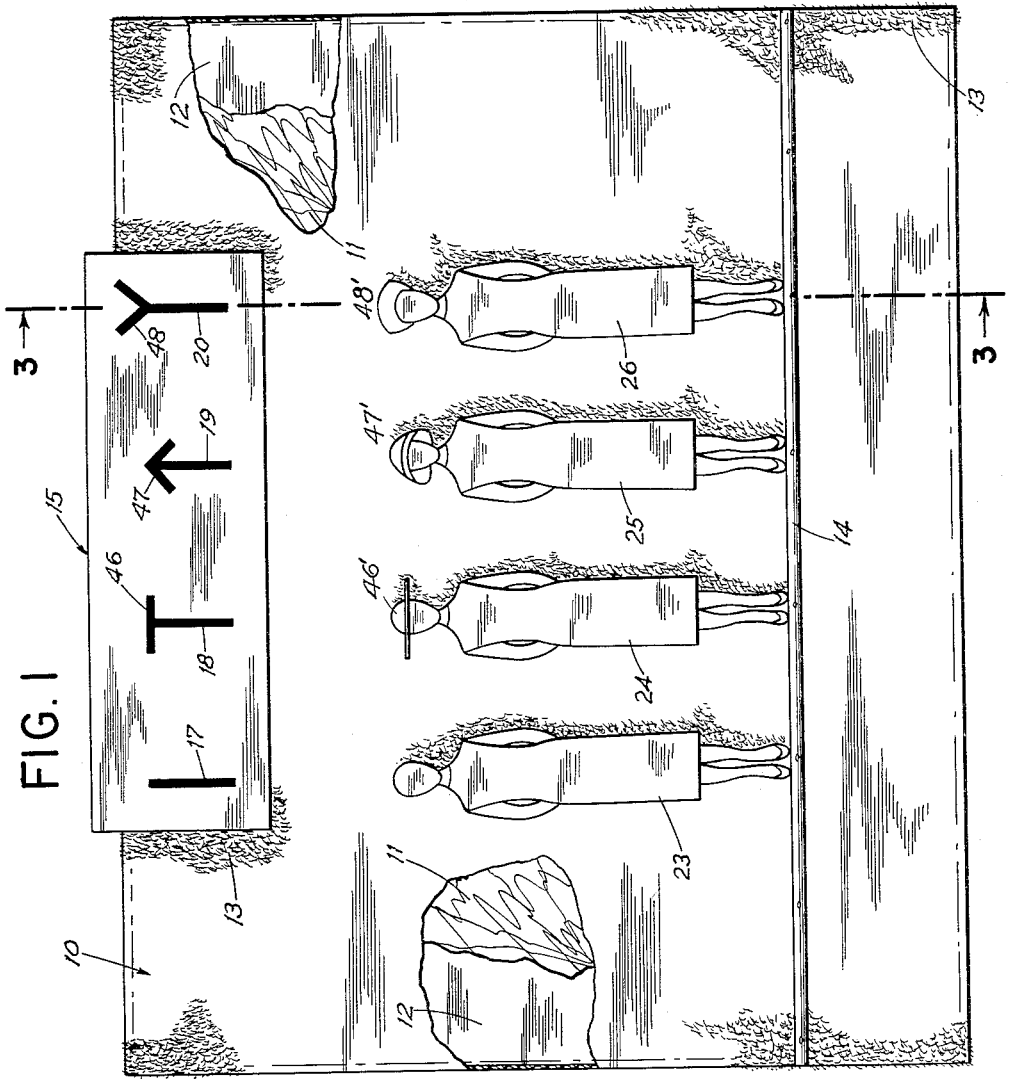

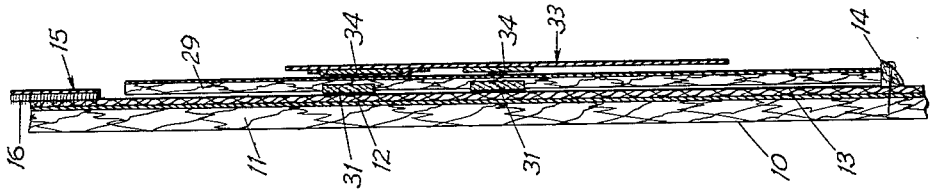
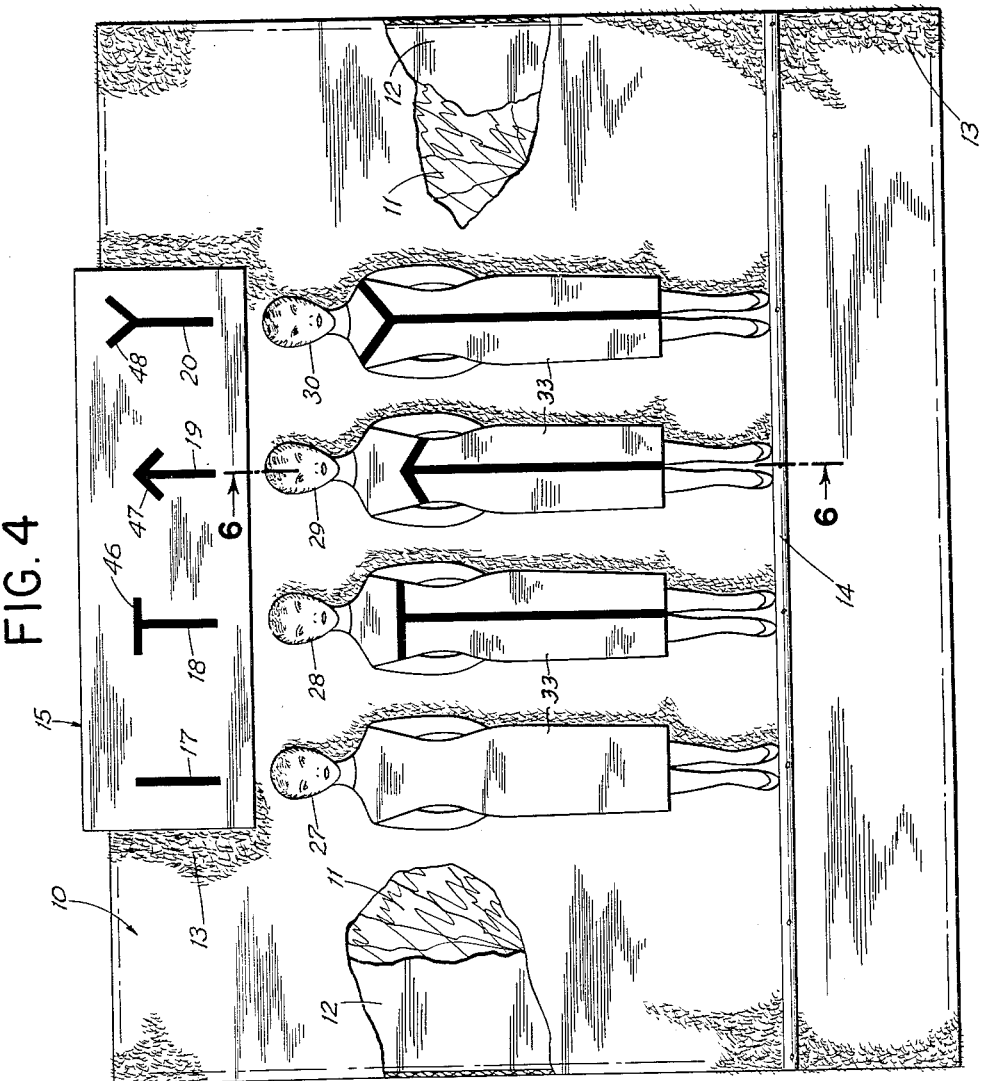
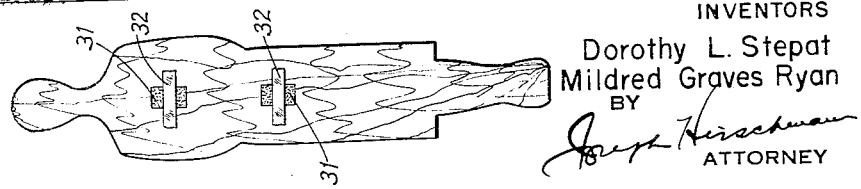

2,987,831
TEACHING AID FOR DEMONSTRATING CLOTHING DESIGNS
Dorothy L. Stepat, 4960 Broadway, and Mildred Graves Ryan, 219 E. 69th St., both of New York, N.Y.
Filed Mar. 24, 1958, Ser. No. 723,324
8 Claims. (Cl. 35—56)

This invention relates to teaching aids, more particularly in the art of fashion design for students of dressmaking, tailoring, millinery, and other fields of wearing apparel.

The general object of the invention is to provide a novel visual teaching aid or educational device for classes in fashion design and for television audiences, the teaching aid having as one of its functions the illustration of the use of eye-compelling or dominant lines or outlines, produced with the aid of color, texture and otherwise, for the creation of harmony or pleasing contrasts in design, and also of optical illusions in clothing design. In short, the teaching aid illustrates the application of principles of design for different figures or for representing usually the effects of different design principles in the same figure, by utilization of certain elementary design principles and arrangements.

The creation of optical illusions as to height and width is fundamentally a matter of the arrangement of eye-compelling or dominant lines in the design of wearing apparel, the lines being produced, for example, by the contrasts of colors and spaced masses or panels, and by differences in fabric texture and pattern. Thus, while the present teaching aid is illustrated herein as employing, as design guides, key arrangements of dominant lines only, it will be understood that the aid is useful also in showing the student how such dominant lines can be made to appear by contrasts of masses and colors, and of texture and patterns.

The teaching aid comprises a novel device for illustrating, to the student of the design of wearing apparel, means for creating optical illusions and provides interchangeable means for illustrating a variety of effects whereby, for example, a dress of particular design may be shown as altered in various ways so as to make the wearer appear taller or shorter, or broader or thinner, as desired. Through illustration of the principles of optical illusions, the teaching aid is useful in showing how hats, dresses, coats, suits, and the like, may be designed for producing flattering effects in the appearance of the wearer.

As will be understood from the following more detailed description of our invention, the teaching aid is useful for the comparative illustration of design principles for creating pleasing aesthetic effects of different kinds with single garments or combinations of garments for persons of different stature, weight, shape of face, and the like.

In carrying out our invention, we provide a surface in the form of a board or panel or a stand, which may be supported in any suitable way on which there are adapted to be positioned, in interchangeable array, a plurality of cutous, figures, panels or manikins which are so related that they illustrate various principles of design. The board or stand is provided in any suitable way with means for securing the various objects in more or less vertical position thereon. We prefer to employ a board made of any suitable material such as wood, plastic, synthetic board like "Masonite" and the like, and having a coating or sheathing of a napped fabric to which flat objects provided with a similar napped fabric or surface will adhere; the board is provided also with a magnetic sheet or film such as a thin sheet of steel, to enable objects provided with magnets to cling thereto. The objects placed on the board include a panel which illustrates the principles of design of the garment under consideration and also a plurality of cutous which serve to illustrate a garment embodying the various design principles. These latter may themselves embody an illustration of the garment under consideration in different modifications thereof according to the design principle which its construction follows; however, the invention contemplates also the provision of a series of "blank" or basic manikins on which there may be superposed one or more overlays completely or partially congruent with the outline of parts of the manikin. These overlays may illustrate hats, dresses, blouses, skirts, coats, etc. of similar general design on the several manikins, but differing by the different emphasis on vertical, horizontal, or angular dominent lines or by the spacing of groups of parallel, vertical or horizontal lines, or differing in color, texture, or pattern. These dominant lines or masses may be produced by contrasting piping, or the like, or by bands or sections of contrasting color or texture.

The manikins may be of the same standard or "normal" size, or they may be of different heights and widths to correspond to the figures of the actual wearers.

In the accompanying drawing forming part of this specification,

FIG. 1 is a front elevational view of one form of the invention;

FIG. 2 is a rear elevational view of one of the manikins of FIG. 1;

FIG. 3 is a section along the plane 3—3 of FIG. 1;

FIG. 4 is a front elevational view of another embodiment of the invention;

FIG. 5 is a rear elevational view of one of the manikins of FIG. 4;

FIG. 6 is the section 6—6 of FIG. 4, somewhat enlarged;

FIG. 7 is a front elevational view of a third form of the invention;

FIG. 8 is a rear elevational view of the overlays of FIG. 4 or FIG. 7; while

FIG. 9 is the section 9—9 of FIG. 7, somewhat enlarged.

A first form of the invention is illustrated in FIGS. 1, 2, and 3. This form comprises a demonstration board, and, mounted on the board, a removable index panel or design key with elementary linear designs in spaced arrangement thereon, and a plurality of removable platelike manikins with simulated clothing, the clothing of each manikin corresponding, in optical principles, to one of the designs.

The board, generally designated 10, is of laminated construction, comprising a sheet of wood 11 at the rear, a sheet of soft iron 12 forward thereof, and a frontal covering of cotton flannel 13 or other napped or flocked material. The board is suited for mounting on a wall or easel, or for forming part of a stand. Across the front of the board 10 is a horizontal bar or molding 14 which serves as a base line to aid in properly aligning the flat manikins, shortly to be described. The index panel 15 may be a sheet of any suitable material, and is coated on its rear surface with cotton flannel 16, (seen only in the sectional view, FIG. 3) or other napped material. The elementary linear designs of the index panel are spaced horizontally and are printed or otherwise applied to the front surface thereof, as shown.

The linear designs, of which there are here four, are individually designated 17, 18, 19, and 20. Associated with the design panel or key are four manikins, shown at 23, 24, 25 and 26, each comprising a sheet of suitable material 21, such as wood, and having applied to at least part of the rear surface one or more sheets 22 of napped material or flocked and adhesively secured fibers (shown only in FIG. 2). The bodies of the manikins are alike in size and shape but the simulated clothing applied to them, and visible from the front, is in each case different.

As will be readily understood, both the index panel and the manikins may be applied to the board 10 and held in position thereon owing to the intermeshing or interlocking of the nap of the flannel on the front surface of the board and the napped material on the rear of the index panel and on the manikins. Preferably, the index panel is mounted at the upper part of the board, and the manikins are mounted on the board and held in proper alignment with the aid of the molding 14, and with each manikin beneath the linear design to which its simulated clothing relates. The mode of use of the display devices illustrated in FIGS. 1 to 3 will be described hereinafter.

A second form of the invention is shown in FIGS. 4, 5, and 6. This form comprises the demonstration board 10, and, mounted on the board, the removable index panel 15, and a plurality of removable plate-like magnetic manikins 27, 28, 29, 30; and a plurality of paramagnetic overlays in simulation of dresses or frocks mounted on the manikins and held thereon magnetically. The simulated dresses of the overlays correspond, in optical principles, to the designs of panel 15.

The panel 15 is held in position on the board 10 as described above. In this form of the invention the construction of the manikins differs in certain respects from that of the manikins of FIG. 1.

As in the previously described form of the teaching aid, there are four manikins illustrated, but their number can be greater or less than four, and the number of key designs on panel 15 can be varied correspondingly. Each manikin may be cut out of a sheet of suitable material, such as wood, plastic, "Masonite" or other stiff sheet material. Preferably recessed at the rear of each manikin are small permanent magnets 31, which may be held in place by tapes 32. See FIGS. 5 and 6. The manikins are preferably applied to the display board in alignment with the molding 14, and with each manikin beneath one of the linear designs of the panel 15. The heads and bodies of the manikins of FIG. 4 are identical, not only as to size and shape, but also as to appearance. In this form of the invention, the simulated clothing of the manikins is represented by the overlays 33, shown in section in FIG. 6, which are removable from the manikins themselves. A typical overlay as of a dress is generally designated 33 and is best shown, in rear elevation, in FIG. 8. The overlays consist of a thin sheet of material having applied to the rear surface two armatures 34, such as small plates of soft iron which may be held in place by tapes 35. The armatures 34 are spaced to coincide with the magnets 31 of the manikins. The design of the dress represented by any overlay 33 may be printed on or otherwise applied to the front surface. It will be noted in FIG. 4 that the dresses represented by the overlays have a common outline; they are congruent with the corresponding portions of the manikins, as up to the neckline, but that the basic designs of the dresses within the outlines are different from each other. These different designs of garment represented by the overlays are preferably applied to the manikins in such arrangement that the dress designs are disposed beneath the designs on the index panel 15 to which they correspond.

It will be plain that, where it is preferred to employ overlays as representations of clothing, the entire overlay may be a sheet of paramagnetic material, and the armatures 34 may be dispensed with. Also, it will be understood from the foregoing, that the front of a manikin and the rear of an overlay may be provided with napped material which will intermesh or releasably interlock on contact under pressure, like two pieces of cotton flannel; or any other suitable means may be employed to cause the overlays to detachably adhere or cling to or be supported on the members.

A third form of the invention is illustrated in FIGS. 7 and 9. This form comprises the board 10 with the magnetic manikins and the paramagnetic overlays as in the second-described form, but instead of index panel 15, there are provided a plurality—here four—of individual panels each having printed on or otherwise applied to its front surface a single elementary linear design. The individual index panels are designated 36, 37, 38 and 39. Each may be a sheet of suitable material 40 coated on its rear surface with cotton flannel 41, mohair, flocked fibers, or the like (seen in sectional view in FIG. 9). The series of panels is preferably applied to the top of board 10 in spaced horizontal relationship, as shown in FIG. 7. Each panel is, of course, held in place on the board due to the intermeshing of the nap of its own fabric material with that of the board.

In FIG. 7, four corresponding manikins 42, 43, 44, and 45 are shown, these manikins being like those of FIG. 4 as to shape and construction; and each manikin is provided with an overlay or a set of overlays showing different garments, as frocks, hats, robes, etc., and/or different designs of the same garment but embodying the principle illustrated by its associated panel 36, 37, 38 or 39.

As will be evident from the foregoing, all of the forms of the invention involve the use of a plurality of models, manikins or basic figures on which are superposed at least partially congruent representatives of garments embodying certain pre-selected principles of design, and generally aimed to produce various aesthetic effects, more particularly by optical illusions by the use of a dominant line or lines in different positions or relationships.

In FIG. 1 and FIG. 4, the index panel 15 has as its primary purpose the illustration of the principles of optical illusion caused by various linear angularly disposed additions to a basic single straight line. The basic straight line forming part of each of the four design indices is that of design 17, a simple vertical eye-compelling or attracting line. The vertical portions of all of the design elements on the index panel are of identical height, yet, as is known, by associating other lines at various angles to the vertical line, the illusion is created of a shortening or lengthening of the vertical line. This known effect is translated into terms of hat, dress, and other garment designs by the manikins, with or without overlays, which can be placed in such relationship to the basic or key designs on panel 15 that the principle of the design of the garment and why it creates the effect that it does, become readily apparent. Thus, a broadening effect is produced by the horizontal line 46 applied at the top of the vertical portion of design 18. This corresponds to the hat 46' (FIG. 1), with its wide horizontal brim, which gives the illusion of a reduced vertical height of the figure (manikin 24).

The arrowhead 47, on the other hand, applied to the top of the vertical line 19 has the effect of reducing even more greatly the apparent height of such line. Manikin 25 translates this effect in terms of hat design as indicated at 47', the figure 25 appearing decidedly shorter than the comparison figure 23, which carries no hat at all, or a very close-fitting cloche hat (not shown).

The inverted arrowhead 48 applied at the top of the vertical line 20 has the opposite effect, i.e., that of apparently increasing the height of the vertical line, and this is evident also in the corresponding style of hat 48' on manikin 26. The hats 46', 47', and 48' may form an integral part of the manikins, or they may constitute, say with a head portion, fragmentary overlays on a basis manikin, like 23.

It will accordingly be seen that FIG. 1 illustrates the optical effects produced by different shapes of hats applied to a common manikin.

FIG. 4 illustrates the optical effect produced by different designs or groups of dominant lines within a common dress outline. The overlay dress 33 applied to manikin 27 is shown without any design within its outline, and corresponds to design 17, and thus both the manikin and the dress appear as of normal height and breadth. The overlay dress 33 of manikin 28 carries a design, like 18 which makes the manikin appear broader in the chest region and shorter in height. The pattern of the overlay 33 of manikin 29, according to design 19, gives the effect of a still greater reduction in height. On the other hand, the pattern of the overlay 33 of manikin 30, following design 20, gives the effect of a taller manikin and a longer dress.

FIG. 7 is a study of various uses of eye-compelling lines to achieve different optical effects based on principles different from those embodied in panels 15 of FIG. 1 and 4. The overlay dresses 33 of the manikins 42 and 43 and the corresponding designs of panels 36 and 37 give, respectively, the effects of exaggerated height and exaggerated width. Panels 38 and 39 show the different effects obtained by the separation of the two dominant vertical parallel lines. When the lines are relatively close to each other, the appearance is had of a panel of exaggerated height. The principle is substantially reproduced in the overlay 33 of manikin 44. On the other hand, when the lines are relatively distant from each other, the appearance is had of a panel of exaggerated width. This principle is embodied in the overlay 33 of manikin 45. Manikins 44 and 45, and the outlines of their overlays are of the same height and breadth, yet manikin 44 appears to be slimmer and taller than manikin 45.

Herein only elementary means for teaching design calculated to produce optical illusions are illustrated. However, the principles illustrated are fundamental. With the use of overlays in simulation of clothing applied to several like manikins, relatively easy experiments may be made for the purpose of determining the most flattering design of apparel for a manikin of different proportions. Various apparent changes in certain dimensions of a manikin may be made simply by use of properly placed eye-compelling design lines or panels.

Thus, by extension, the student learns from the present teaching aid how best to position desirably eye-compelling lines and panels in clothes intended for a particular wearer.

Those versed in the art will readily understand how apparent changes in the proportions of a wear effected through the use of dominant lines in wearing apparel, is the basis of equivalent apparent changes effected by mass and color contrasts. Obviously, the present teaching aid may be used with colored overlays for the manikins for the purpose of experimentally determining the best suited design for the particular manikin and for a wearer whose proportions correspond to those of the manikin. To the same end there may be used overlays consisting of or having secured thereto samples of fabric to illustrate the effect of different textures and patterns (e.g., of large or small pattern units) as well as of color.

Although the overlays are illustrated in FIG. 4 as representing a dress or frock, they can also represent a hat, robe, or other garment. It will be obvious that the provision of mountable overlays and of the design panel 15 creates such a flexible combination of parts that, for example, two or more overlays can be applied to the same manikin to illustrate blouse and skirt combinations, hat and coat combinations, etc.

In place of the board described above, there may be employed a stand in the form of a grooved or perforated bar of wood, plastic, or the like, on which the manikins are supported by means of blocks fitting into the groove or of pegs fitting into holes. Suitable means may then be provided for supporting the panel above or below the manikins. In this form of the invention, the manikins may themselves be provided with a magnetic sheet or film of steel and/or with a felt or similar sheath, as described hereinabove in connection with the board 10, to facilitate the mounting thereon of overlays provided with magnets or with similar felt backings.

The manikins can, if desired, differ among themselves not only in size and shape, but also in hair coloring, facial features, postures, and the like.

We claim:
1. A visual teaching aid comprising a demonstration board having thereon in spaced arrangement a plurality of elementary linear representations of the visual effect of different costumes, and, mounted on said board, a like plurality of removable manikins each provided with simulated clothing corresponding to one of said costumes, with each manikin placed in alignment with the linear representation which its simulated clothing embodies.

2. The teaching aid of claim 1, wherein the demonstration board is paramagnetic and each manikin is magnetic, and including a plurality of removable, paramagnetic overlays for said manikins, each overlay being provided with a simulation of wearing apparel corresponding to one of said linear representations.

3. The teaching aid of claim 2, wherein the outline of the overlays is congruent with at least a part of the outline of the manikins.

4. A visual teaching aid comprising a paramagnetic demonstration board and, mounted on said board, a panel carrying a plurality of spaced elementary linear representations of the visual effect of different costumes, a like plurality of magnetic manikins and a like plurality of paramagnetic overlays each of which is provided with a simulation of wearing apparel embodying one of said linear representations and being mounted on one of said manikins.

5. The teaching aid of claim 4, wherein the linear representations are so spaced on the panel that the manikins can be mounted on said board in such arrangement that the overlay of each manikin is aligned with the representation which its simulated wearing apparel embodies, whereby the different design effects can be visually compared.

6. A visual teaching aid comprising a board having a line or design thereon constituting an elementary linear representation of the visual effect of a costume, and a removable manikin adapted to be mounted on said board in alignment with said design, said manikin being provided with a simulation of wearing apparel embodying the principles of said design.

7. A visual teaching aid comprising a board having a row of linear designs thereon constituting representations of the visual effect of different costumes, and a plurality of removable manikins adapted to be mounted on said board with the manikins in selected relationship with the said designs, each manikin being provided with a simulation of wearing apparel embodying the principles of one of said designs.

8. A visual teaching aid including a demonstration board comprising a stiffened paramagnetic member having a facing of a napped fabric, a panel illustrating basic designs illustrating the visual effect of different costumes and having a nap on its rear surface adapted to interlock with the nap on the board for supporting the panel thereon in substantially vertical position, a set of manikins having magnets secured thereto for supporting the same on the board, and a plurality of overlays each provided with a paramagnetic sheet for supporting the same on the manikins.

References Cited in the file of this patent
UNITED STATES PATENTS

| | | |
|---|---|---|
| 553,533 | Lord | Jan. 28, 1896 |
| 1,516,264 | Bliss | Nov. 18, 1924 |
| 2,282,871 | Malbon | May 12, 1942 |
| 2,331,776 | Heggedal | Oct. 12, 1943 |
| 2,363,914 | Wakefield | Nov. 28, 1944 |
| 2,501,902 | Howell | Mar. 28, 1950 |
| 2,581,595 | Mioduski et al. | Jan. 8, 1952 |
| 2,722,754 | Slote | Nov. 8, 1955 |